(12) United States Patent
Maruyama et al.

(10) Patent No.: US 7,342,866 B2
(45) Date of Patent: Mar. 11, 2008

(54) OPTICAL DISC AND ITS INFORMATION RECORDING METHOD AND APPARATUS

(75) Inventors: Sumitaka Maruyama, Yokohama (JP); Chosaku Noda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 703 days.

(21) Appl. No.: 10/795,396

(22) Filed: Mar. 9, 2004

(65) Prior Publication Data
US 2004/0179455 A1 Sep. 16, 2004

(30) Foreign Application Priority Data
Mar. 14, 2003 (JP) .............. 2003-070620
Feb. 4, 2004 (JP) .............. 2004-028216

(51) Int. Cl.
*G11B 7/24* (2006.01)
(52) U.S. Cl. .............. 369/111; 369/275.4
(58) Field of Classification Search .......... 369/47.22, 369/47.28, 47.47, 47.48, 59.25, 111, 275.3, 369/275.4, 47.25
See application file for complete search history.

(56) References Cited

U.S. PATENT DOCUMENTS

| | | | |
|---|---|---|---|
| 6,909,677 B1 * | 6/2005 | Akiyama et al. ......... 369/47.27 |
| 6,947,364 B1 * | 9/2005 | Hogan et al. ............ 369/53.45 |
| 7,218,584 B2 * | 5/2007 | Shimoda et al. ......... 369/47.27 |
| 7,221,641 B2 | 5/2007 | Noda et al. | |
| 2002/0012299 A1 * | 1/2002 | Asano ..................... 369/47.19 |
| 2003/0012123 A1 | 1/2003 | Miyamoto et al. | |
| 2003/0169525 A1 * | 9/2003 | Ogawa et al. ................ 360/29 |
| 2004/0228255 A1 * | 11/2004 | Noda et al. .............. 369/59.25 |
| 2004/0246863 A1 | 12/2004 | Ando et al. | |
| 2004/0252606 A1 * | 12/2004 | Noda et al. .............. 369/47.27 |
| 2005/0018580 A1 * | 1/2005 | Schep ..................... 369/59.23 |
| 2005/0117873 A1 * | 6/2005 | Kojima et al. ................ 386/46 |
| 2006/0002265 A1 * | 1/2006 | Kojima .................... 369/47.31 |
| 2007/0089122 A1 * | 4/2007 | Ando et al. .................. 720/718 |

FOREIGN PATENT DOCUMENTS

| | | |
|---|---|---|
| EP | 0 837 471 A2 | 4/1998 |
| JP | 4-172623 | 6/1992 |
| JP | 2663817 | 6/1997 |
| JP | 10-134421 | 5/1998 |
| JP | 11-149644 | 6/1999 |
| JP | 11-250462 | 9/1999 |
| JP | 2000-11460 | 1/2000 |
| JP | 2001-34952 | 2/2001 |
| JP | 2003-503809 | 1/2003 |
| WO | WO 03/079335 A1 | 9/2003 |

OTHER PUBLICATIONS

Japanese Office Action dated Feb. 7, 2006 for Appln. No. 2004-028216.
Japanese Office Action dated Dec. 19, 2006 for Appln. No. 2004-028216.

* cited by examiner

*Primary Examiner*—Hoa Nguyen
*Assistant Examiner*—Henok Heyi
(74) *Attorney, Agent, or Firm*—Pillsbury Winthrop Shaw Pittman

(57) ABSTRACT

Recording timing of a Data segment is set so as to avoid locating a wobble modulated portion as preformat information which indicates information on Physical segments of a recording type optical disc, and a recording start head position of the Data segment to be recorded in a track, in the same area of the track.

4 Claims, 15 Drawing Sheets

SYNC field

| IPW | NPW | IPW | NPW |
|---|---|---|---|
| 6 wobbles | 4 wobbles | 6 wobbles | 68 wobbles |

| | | | | | | | |
|---|---|---|---|---|---|---|---|
| Zo = m+1<br>Tr = 0<br>Ph = m+12 | Zo = m+1<br>Tr = 0<br>Ph = m+13 | Zo = m+1<br>Tr = 1<br>Ph = 0 | Zo = m+1<br>Tr = 1<br>Ph = 1 | | | | |
| Zo = m+1<br>Tr = 0<br>Ph = m+12 | Zo = m+1<br>Tr = 0<br>Ph = m+13 | Zo = m+1<br>Tr = 1<br>Ph = 0 | Zo = m+1<br>Tr = 1<br>Ph = 1 | | | | |
| Zo = m<br>Tr = n<br>Ph = m+11 | Zo = m<br>Tr = n<br>Ph = m+12 | Zo = m+1<br>Tr = 0<br>Ph = 0 | Zo = m+1<br>Tr = 0<br>Ph = 1 | | | | |
| Zo = m<br>Tr = n<br>Ph = m+11 | Zo = m<br>Tr = n<br>Ph = m+12 | Zo = m+1<br>Tr = 0<br>Ph = 0 | Zo = m+1<br>Tr = 0<br>Ph = 1 | | | | |
| Zo = m<br>Tr = n−1<br>Ph = m+11 | Zo = m<br>Tr = n−1<br>Ph = m+12 | Zo = m<br>Tr = n<br>Ph = 0 | Zo = m<br>Tr = n<br>Ph = 1 | | | | |
| Zo = m<br>Tr = n−1<br>Ph = m+11 | Zo = m<br>Tr = n−1<br>Ph = m+12 | Zo = m<br>Tr = n<br>Ph = 0 | Zo = m<br>Tr = n<br>Ph = 1 | | | | |

Outer ← L  G  L  G  L  G → Inner

Zo : Zone address
Tr : Track address
Ph : Physical segment address

FIG. 4

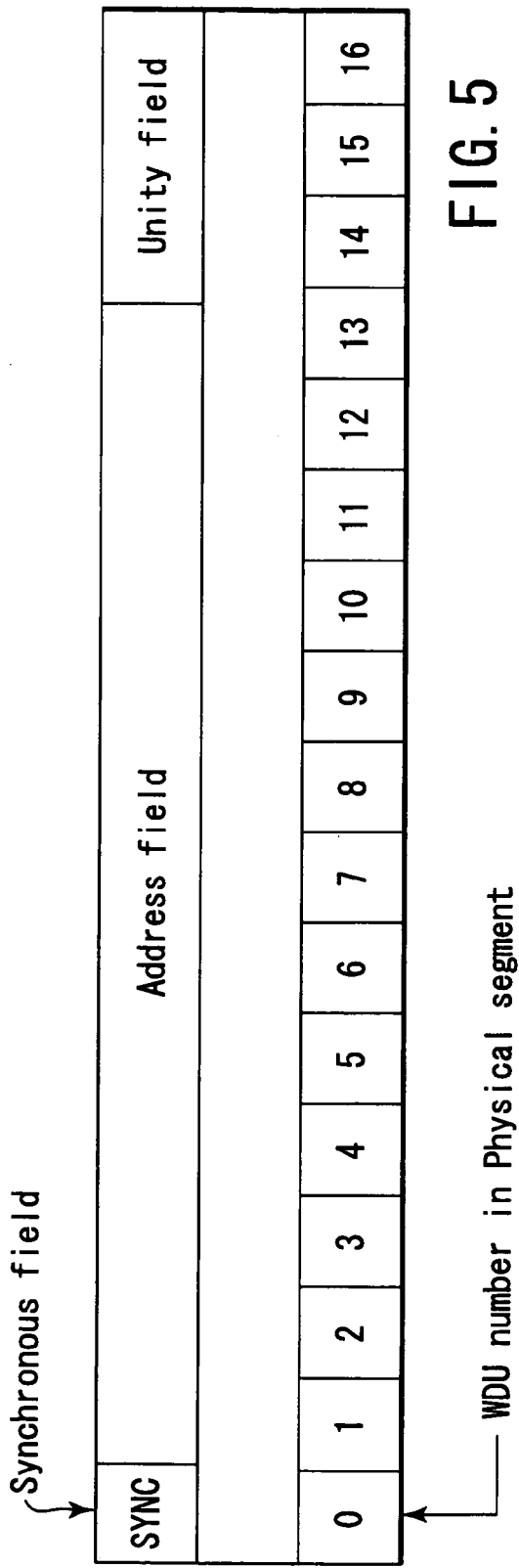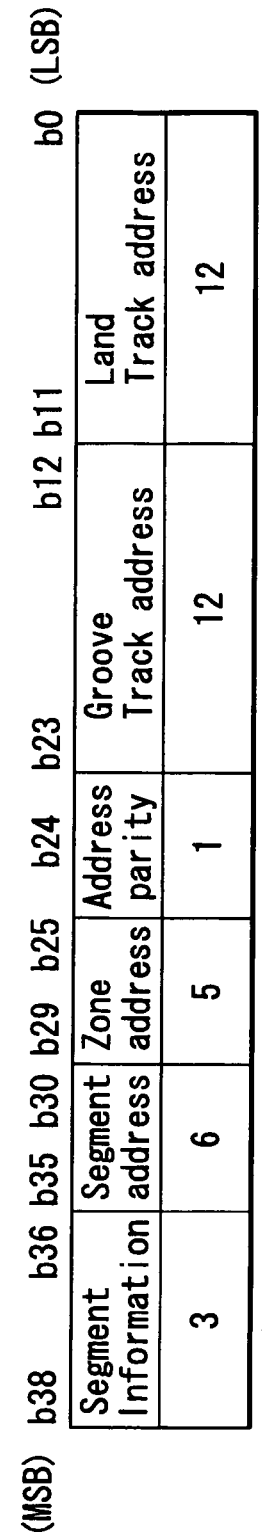
FIG. 5
FIG. 6

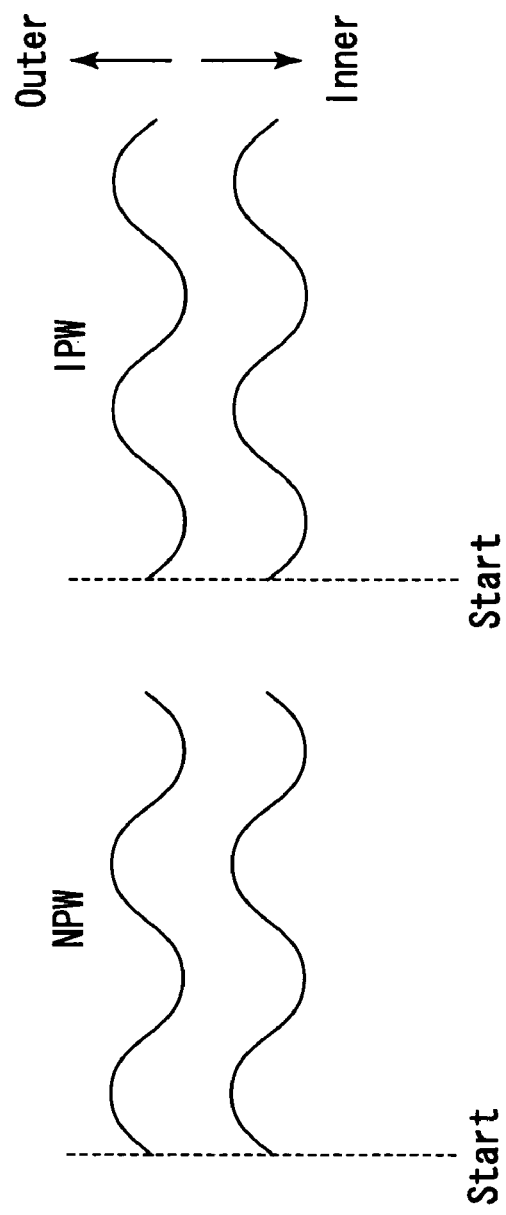

| Address field | | | |
|---|---|---|---|
| IPW | bit 2 | bit 1 | bit 0 | NPW |
| 4 wobbles | 4 wobbles | 4 wobbles | 4 wobbles | 68 wobbles |

FIG. 9A

| Unity field |
|---|
| NPW |
| 84 wobbles |

FIG. 9B

| Recording cluster | |
|---|---|
| Data segment × n | Guard field |
| 77469 × n | 24 |

FIG. 10

| Initial preset numbers | Initial preset values | Initial preset values | Initial preset values |
|---|---|---|---|
| 0h | 0001h | 8h | 0010h |
| 1h | 5500h | 9h | 5000h |
| 2h | 0002h | 0Ah | 0020h |
| 3h | 2A00h | 0Bh | 2001h |
| 4h | 0004h | 0Ch | 0040h |
| 5h | 5400h | 0Dh | 4002h |
| 6h | 0008h | 0Eh | 0080h |
| 7h | 2800h | 0Fh | 0005h |

Initial values of shift register

Feedback shift register (ECC block constitution)

Scrambled frame arrangement

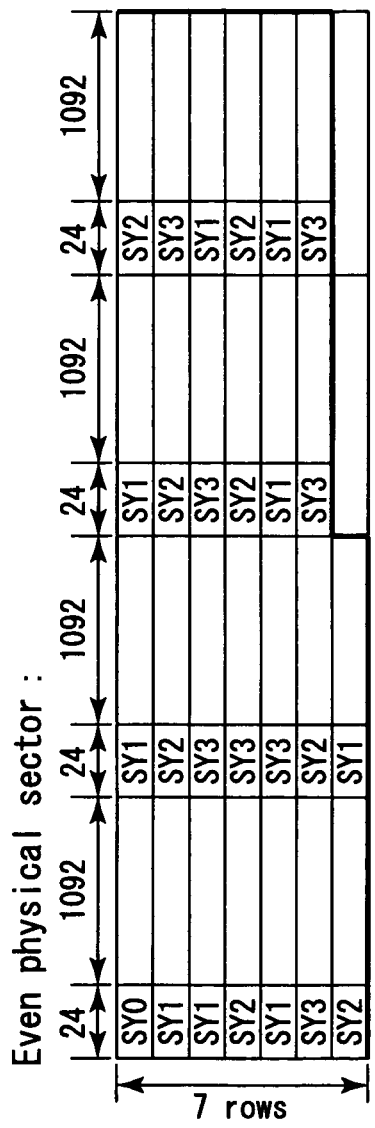
FIG. 21A
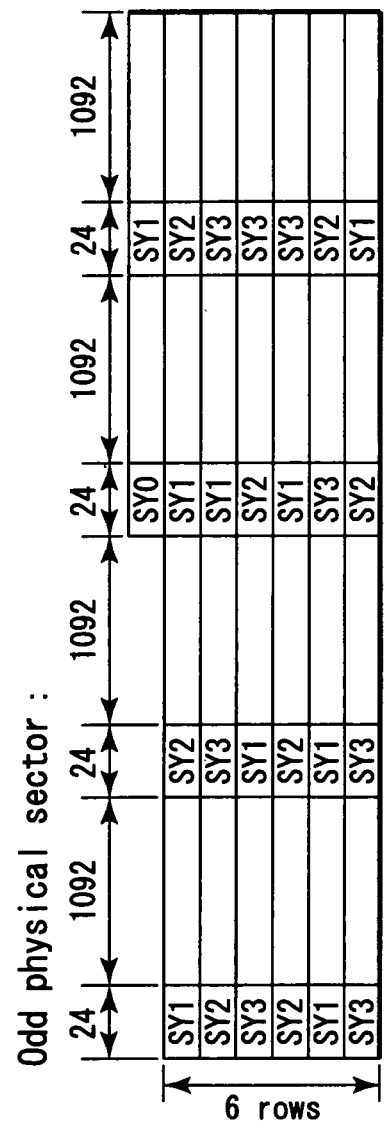
FIG. 21B
FIG. 22

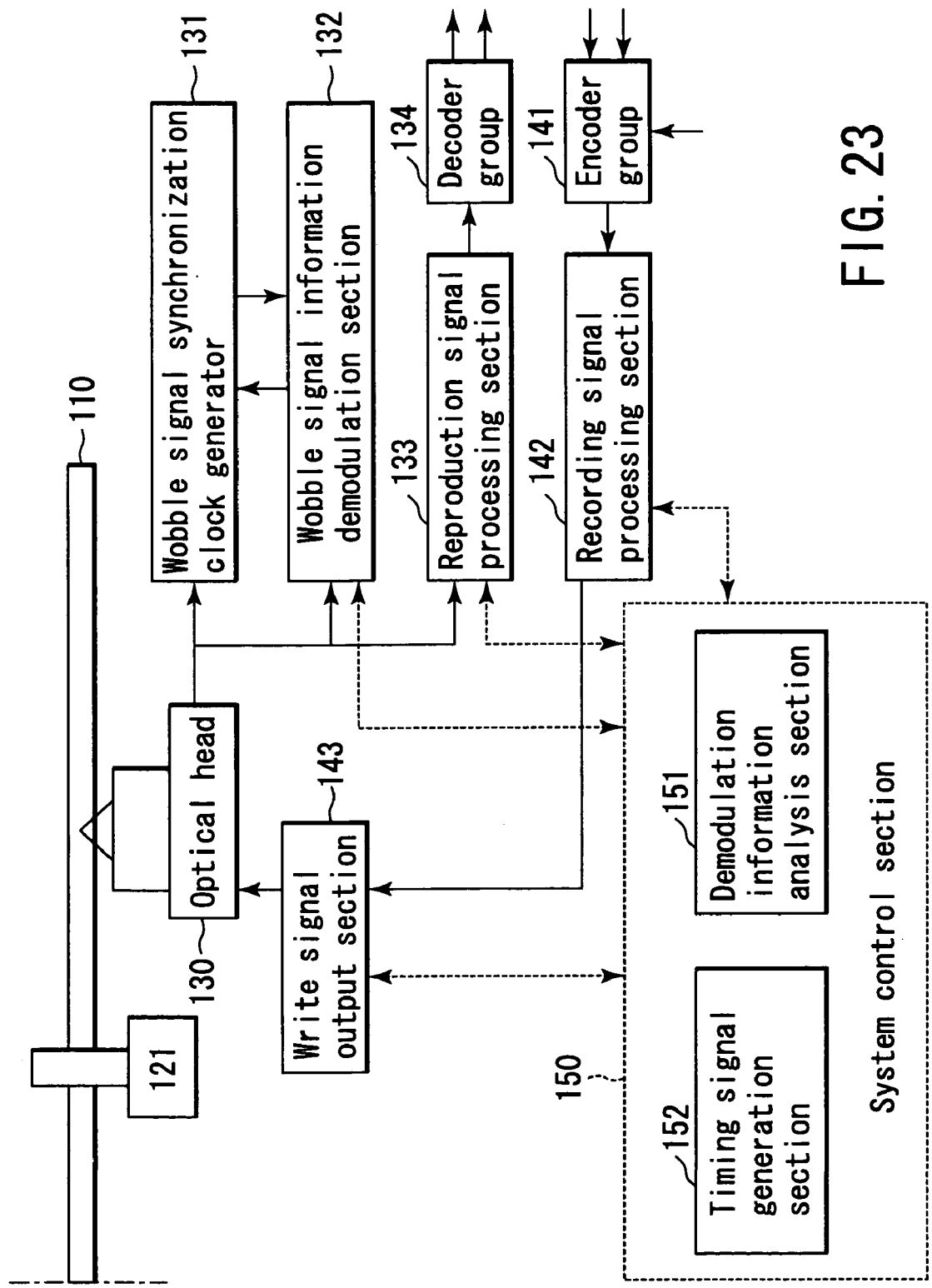
F I G. 23

OPTICAL DISC AND ITS INFORMATION RECORDING METHOD AND APPARATUS

CROSS-REFERENCE TO RELATED APPLICATIONS

This application is based upon and claims the benefit of priority from the prior Japanese Patent Applications No. 2003-070620, filed Mar. 14, 2003; and No. 2004-028216, filed Feb. 4, 2004, the entire contents of both of which are incorporated herein by reference.

BACKGROUND OF THE INVENTION

1. Field of the Invention

This invention relates to an optical disc and its information recording method and apparatus.

2. Description of the Related Art

In a recording type optical disc, preformat information is recorded in advance on the optical disc. When an information recording apparatus for optical discs records data on the optical disc, it detects the preformat information, refers to this detected information, and decides a recording position of the data.

The optical disc has a spirally formed recording track. The recording track is divided into Physical segments having a predetermined length, and an address is assigned to each segment. This address is written as the preformat information into each segment.

In a method for writing the preformat information, recording is achieved by prepits on the track. Recently, there has been a method for recording the preformat information by forming a groove and a land on a surface of the optical disc, forming a meandering wobble signal on the side walls of the groove, and modulating this wobble signal.

On the other hand, as to data to be recorded as user data on the recording track, codes for error correction are usually added to original data, which is divided into smaller synchronous frames to become data to be recorded. For example, in a DVD (digital versatile disc), an error correction code block (ECC blocks) is modulated, synchronous codes are added at predetermined intervals, a plurality of synchronous frames is generated, and rows of the plurality of synchronous frames result in the data to be recorded. It should be noted that the user data here means such data that is recorded on the optical disc and reproduced by a user using a recording/reproduction apparatus, unlike the preformat information.

There are the following documents concerning the optical disc.

Jpn. Pat. No. 2,663,817, according to this document, (document 1) . . . identification information is shared by the land (L) and groove (G) and deviates from a center of the land and groove. This is associated with a current DVD-RAM disc standard.

Jpn. Pat. Appln. KOKAI Publication No. 04-172623, Jpn. Pat. Appln. KOKAI Publication No. 2000-11460, according to these documents, a recording mark is formed at a groove position, and a land portion has land prepits for addresses. This is associated with current DVD-RW discs and DVD-R discs.

Jpn. Pat. Appln. KOKAI Publications No. 11-149644, and No. 2001-34952, according to these documents, a method for recording in the land (L)/groove (G) is shown, wherein address information is recorded by wobble modulation using Gray codes.

Greater capacity has recently been desired in the optical discs. In order to accomplish this, so called land-groove optical discs have been developed which use both the groove formed on an optical disc substrate and the land between the grooves as the recording track. Further, concerning the preformat information, research is being conducted into methods for recording the wobble signal after modulating. The reason is that data recording areas can be efficiently utilized as compared with the method in which the prepits are recorded. In other words, when the method in which the prepits are recorded is adopted, recording of the user data is physically restricted in parts where the prepits are formed.

Here, when adopting the method in which the wobble signal is modulated to record the preformat information, the inventor has focused attention on an important relationship between a position of the preformat information, and a recording start position and a recording end position of the user data. In other words, so-called additional recording is performed in a rewritable optical disc wherein the user data is recorded by being tied to an already-recorded portion. Further, overwrite recording may sometimes be performed on a portion where the recorded user data has already been recorded. The overwrite recording may sometimes be executed repeatedly in the same area. In such a case, if the position of the preformat information and the recording start position of the user data exit in the same area, such problems occur as that the preformat information is deformed and a detection level is lowered.

BRIEF SUMMARY OF THE INVENTION (A) Therefore, in embodiments of the present invention, an optical disc and its information recording method and apparatus are provided which are capable of performing good high-density recording without causing the problems described above.

(B) Furthermore, an object in the embodiments of this invention is to provide an optical disc and its information recording method and apparatus capable of maintaining stable detection of preformat information.

To attain the object mentioned above, a basic concept in the embodiments of the present invention is as follows: An optical disc is disclosed in which a recording track is divided into a plurality of Physical segments, and the recording track meanders, and when Data segments recorded on the recording track are reproduced, a wobble signal is obtained which is modulated in accordance with the meandering shape of the recording track. Here, a modulated portion (IPW) and an unmodulated portion (NPW) of the wobble signal form a synchronous field (SYNC) for the Physical segments, and a head position of the Data segment (M+1) recorded on the recording track is located in the unmodulated portion (NPW).

Furthermore, a recording method and a recording apparatus which record information on the aforementioned optical disc are disclosed in the embodiments.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view showing an arrangement example of Physical segments in the vicinity of a zone boundary (zone m and zone m+1) of the optical disc according to the present invention;

FIG. 5 is an explanatory view showing a layout of a wobble address which is information on periodic positions;

FIG. 6 is a view showing a layout of a periodic Address field of FIG. 5;

FIG. 8A to FIG. 8C are views showing a layout of wobble data units (WDU) in a synchronous field of FIG. 5, and examples of wobble definitions;

FIG. 9A and FIG. 9B are views showing an example of a specific layout of the wobble data units (WDU) in an Address field, and a specific format of the wobble data unit (WDU) in a Unity field;

FIG. 10 is an explanatory view of a recording cluster according to this invention;

FIG. 21A and FIG. 21B are explanatory views showing how data in the ECC block is modulated, to which synchronous codes are added, to become a recorded data field;

FIG. 22 is an explanatory view showing examples of various types of synchronous codes (SYNC); and FIG. 23 is an explanatory view showing a configuration example of an apparatus according to the present invention.

DETAILED DESCRIPTION OF THE INVENTION

Embodiments of this invention will hereinafter be described with reference to the drawings.

Figure 1:
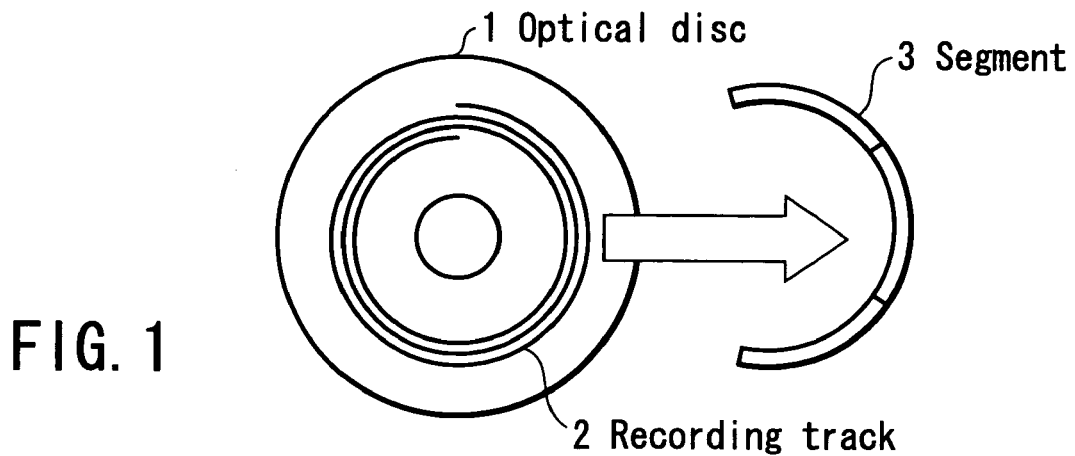
FIG. 1 is a schematic explanatory view of an optical disc related to the present invention.

Before explaining specific examples of the present invention, prerequisite techniques will first be described. In FIG. 1, an optical disc 1 usually has a spirally formed recording track 2. The recording track 2 is divided into Physical segments 3 having a predetermined length, and an address is assigned to each Physical segment 3. This address is written as preformat data into each Physical segment 3.

In an optical disc adopting a CLV method in which record circuit density is constant, all the Physical segments have the same length. If the length of the Physical segments is too long, time to find address information by random access increases, and therefore, the length is selected so that the number of Physical segments 3 will be ten to several tens in one round.

In a preformat method, a prepit is formed at the front of the Physical segment 3. However, portions for the preformat cannot be used as Data areas. A method for solving this problem is to form a wobble signal in accordance with meandering of a groove on a data recording track, and represent format information through the wobble signal.

When the format information is recorded by wobble, a wobble signal to which modulation such as phase inversion or frequency change is applied is recorded. +R applies such a technique. On the other hand, in a DVD-R, prepits are discretely formed in a land between grooves to represent format information.

Figure 2:
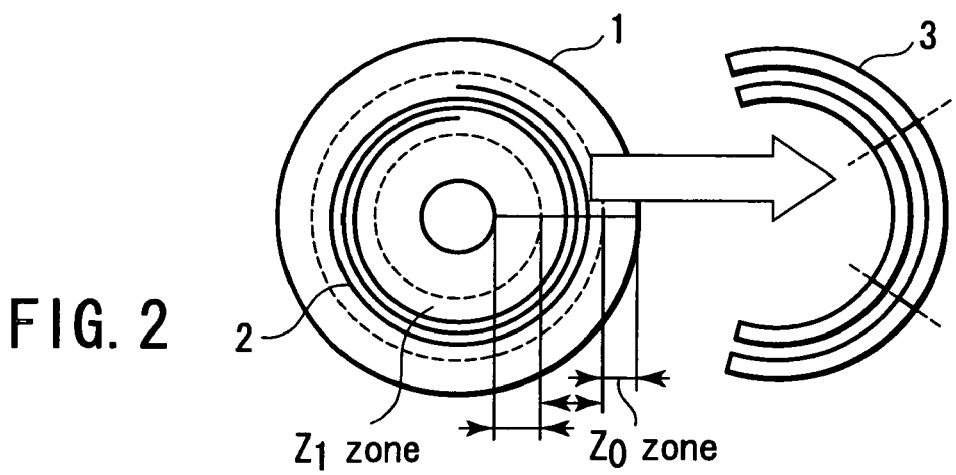
FIG. 2 is a view showing an example of the optical disc having a zone CAV configuration.

FIG. 2 shows an example of a zone CAV configuration. The inside of the optical disc 1 is divided into several zones Z0, Z1, . . . , and the recording track 2 in the same zone has a configuration in which the Physical segments 3 are aligned in a radial direction, as shown in the drawing. In this case, if a length unit is a looking angle into a center of the optical disc, it is possible to directly apply discussion about the length that has continued so far. For example, physical length along a recording track direction of the Physical segments is different on an inner peripheral side and an outer peripheral side in the same zone but the looking angle into the center is the same, so that the length is regarded as the same.

The zone CAV is a format which also uses a land portion between track grooves as the recording track and is effective in land-groove recording type optical discs. This is because a groove wobble can be used directly as land wobble data.

Figure 3:
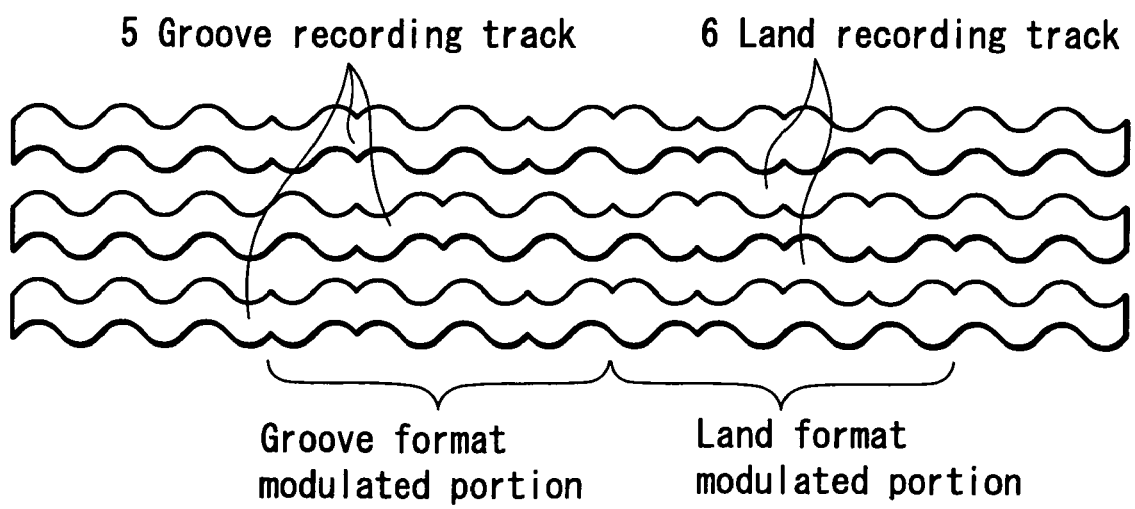
FIG. 3 is an explanatory view showing an example of a wobble modulated portion of a land-groove type optical disc.

FIG. 3 shows a configuration example in principle of the format information of such a land-groove type optical disc. In other words, it shows a portion corresponding to a wobble modulation portion where the preformat information is formed in a Physical segment area.

In a groove format modulation portion, walls on both sides of a groove recording track 5 are formed to change in phase, and format data can be demodulated and reproduced from a reproduced wobble modulation signal. In a land format modulation portion, walls on both sides of a land recording track 6 are formed to change in phase, and format data can be demodulated and reproduced from a reproduced wobble modulation signal. In such a modulation configuration, the land recording track 6 in the groove format modulation portion and the groove recording track of the land format modulation portion have parts in which groove walls on both sides change in reverse phase.

FIG. 4 shows an arrangement example of Physical segments in the vicinity of a zone boundary (zone m and zone m+1). In this example, a Lead-in area, Data area and Lead-out area of the optical disc are each constituted with a zone, a plurality of tracks and a plurality of Physical segments. One Physical segment is specified by a Zone address, a Track address and a Segment address. Physical segments with the same Physical segment number exist in each zone. An angle distance between first channel bits of the Physical segments on adjacent tracks should preferably be smaller than ±4-channel bits in each zone. The angle distance is an expanding angle when looking in a radial direction from the center of the disc. The Physical segment number at a starting position of the track is 0, and this Physical segment is located on a boundary between zones. In each of the Lead-in area, Data area and Lead-out area, the angle distance between the first channel bits of the Physical segments at the starting positions of two tracks is within ±256 channel bits. An address of a land track adjacent to the zone boundary cannot be read.

FIG. 5 shows a layout of a wobble address which is information on periodic positions. The wobble address is used to specify the Physical segments mentioned above. The wobble address is here referred to as a wobble address in periodic position (WAP). The WAP is constituted of 17 wobble data units (WDU). Information contents of the WAP are constituted by a SYNC (synchronous) field, an Address field and a Unity field.

One WDU is assigned to the SYNC (synchronous) field. 13 WDUs are assigned to the Address field. 3 WDUs are assigned to the Unity field.

FIG. 6 shows an example of a layout of the Address field.

Inside the Address field, a Segment Information (3 bits), a Segment address (6 bits), a Zone address (5 bits), an Address parity (1 bits), a Groove Track address (12 bits) and a Land Track address (12 bits) are assigned.

The Segment information is a reserved field, and all 0b are set. Information on "layers" of the disc may be given here. The Segment address is used to indicate Physical segment numbers on the track. The Zone address is used to indicate zone address in the Data area. The Zone address in the Lead-in area is set to 0, and the Zone address in the Lead-out area is set to 18. The Address parity is a parity description portion for the segment information field.

The Groove Track address indicates Track address in the zone when the Physical segment is a groove segment. The Track address are recorded in Gray code format in the Groove Track address.

The Land Track address indicates the track address in the zone when the Physical segment is a land segment. The Track address are recorded in gray code format in the Land Track address.

Figure 7:
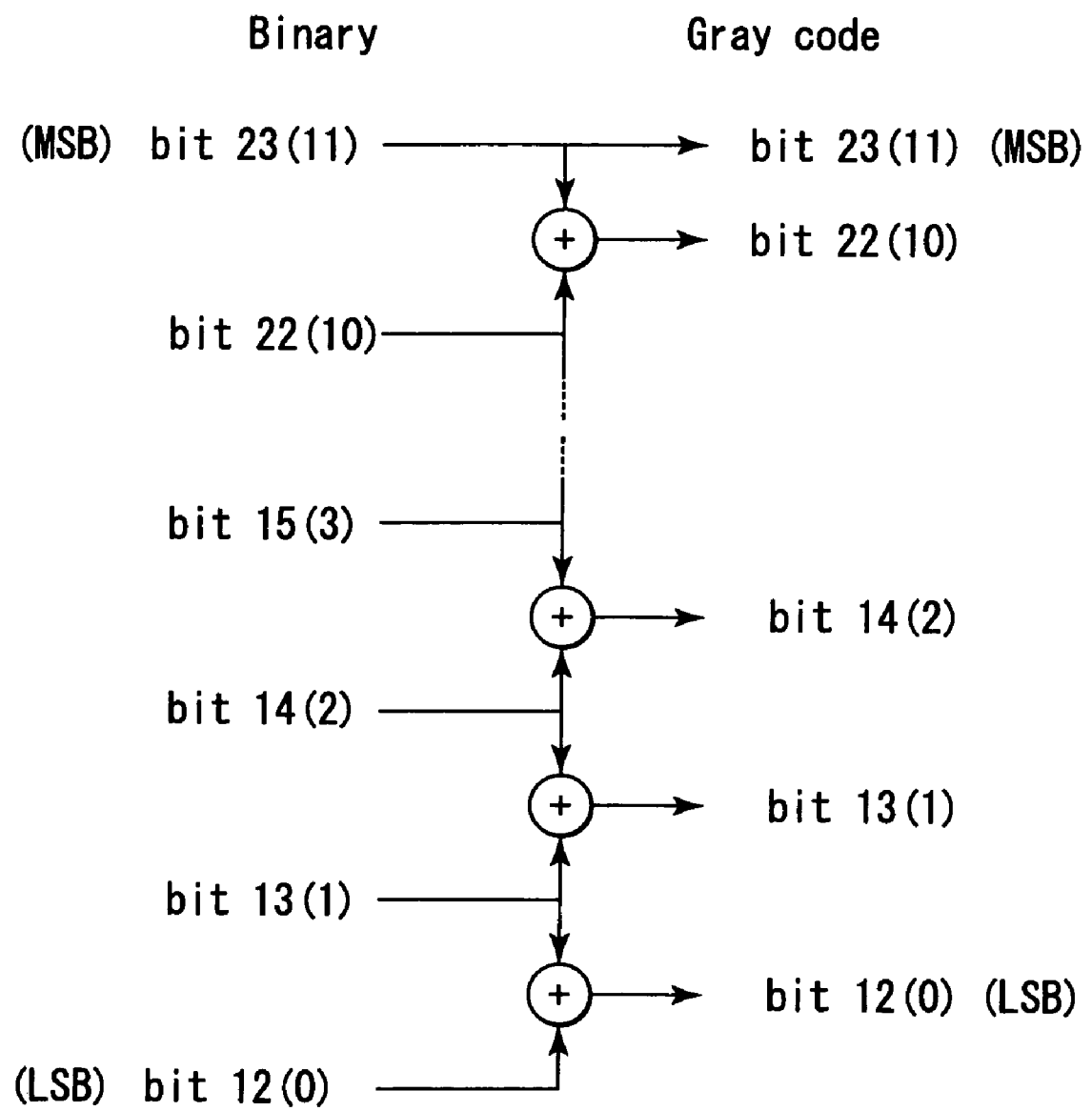
FIG. 7 is an explanatory view of a conversion method from a binary code to a Gray code.

FIG. 7 shows a conversion method from a binary code to a Gray code.

When bits b23-b12 are used, the Groove Track address is obtained, and when bits b11-b0 are used, the Land Track address is obtained.

FIG. 8A shows in detail the WDUs (wobble data units) which form the SYNC (synchronous) field shown in FIG. 5. The synchronous field is constituted of 6 wobbles of inverse phase wobble (IPW), 4 wobbles of normal phase wobble (NPW), 6 wobbles of inverse phase wobble (IPW), and 68 wobbles of normal phase wobble (NPW). The inverse wobble means "1*b*", and the normal wobble means "0*b*". A bit modulation rule is set as follows.

More specifically, the normal phase wobble (NPW) is defined in the case where a wobble starts and changes as shown in FIG. 8B on the outer peripheral side and inner peripheral side of the disc, and conversely, the inverse phase wobble (IPW) is defined in the case where a wobble starts and changes as shown in FIG. 8C.

FIG. 9A shows in detail the WDUs (wobble data units) which form the Address field shown in FIG. 5. 4 wobbles of IPW are first disposed at the head, and next a bit 2 represented by 4 wobbles, a bit 1 represented by 4 wobbles and a bit 0 represented by 4 wobbles are disposed, and then 68 wobbles of NPW are disposed. In other words, the IPW at the head is a synchronization signal, and the next three bits 2, 1 and 0 represent an address.

FIG. 9B shows the WDUs (wobble data units) which form the Unity field shown in FIG. 5. All these WDUs are the NPWs.

A recording cluster recorded on the groove track and the land track mentioned above will next be described. The unit called the recording cluster is used also in the Lead-in area, Data area and Lead-out area.

FIG. 10 shows a form of the recording cluster. The recording cluster is constituted of one or more Data segments and a guard field, for example. The length of the Data segments is equal to the length of 7 Physical segments. One recording cluster is recorded in one time of recording. Numbers noted in the recording cluster indicate the length of field on a byte unit.

The Data segment in the land track does not permit any gap. Similarly, the Data segment in the groove track does not permit any gap, either. When the Data segment is written, its starting Physical segment number satisfies the following equation.

{(number of Physical segments per track)×(Track address)+(Physical segment address)} mod7=0, where "A mod B" means the remainder when A is divided by B. In other words, an address of the Physical segment into which a head of the first Data segment constituting the cluster is written is a multiple of 7 (address 0, 7, 14, . . . ).

Next, in this invention, a concept of "linking" is introduced to a portion that links an already-recorded cluster and a newly-written cluster, when data is additionally recorded. The linking will be described below.

Figure 11:
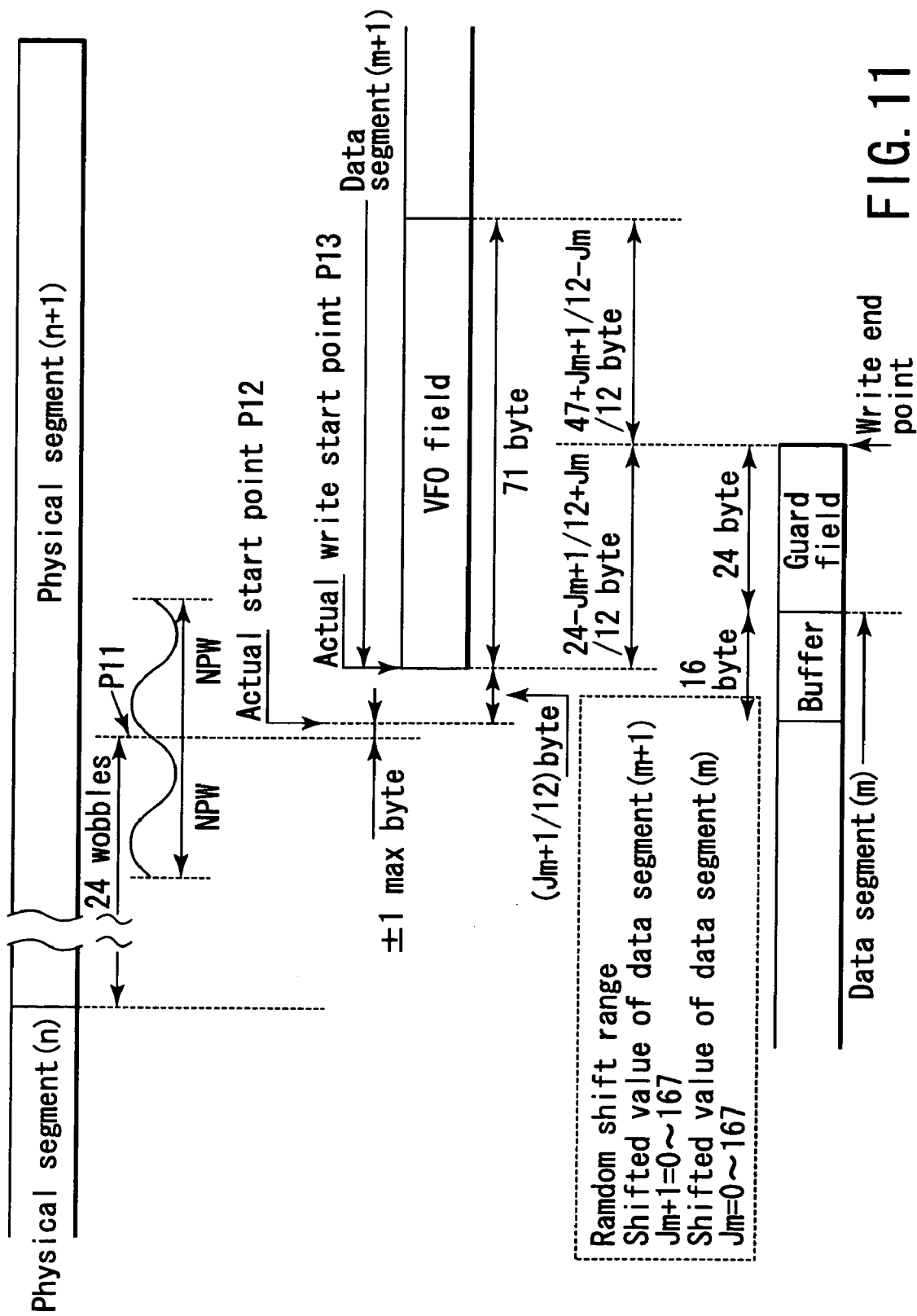
FIG. 11 is an explanatory view of an arrangement relationship between the Physical segments and Data segments according to this invention, and of a link portion of the Data segment.

FIG. 11 shows a relationship among the vicinity of a boundary between Physical segments (n) and (n+1), an already-recorded Data segment (m), and a Data segment which will be recorded after that. First, in this invention, a reference point (P11) is determined at a position after 24 wobbles from a start position of the Physical segment (n+1). Next, an actual start point (P12) is determined at a position of ±1 byte. This ±1 takes a range of error into account.

Next, an actual write start point (P13) is set within a range of random shift amount (J/12 byte). J has 0 to 167 bits, and is varied at J random, and thus writing is started. Data of the guard field is set to 7Fh.

Figure 12:
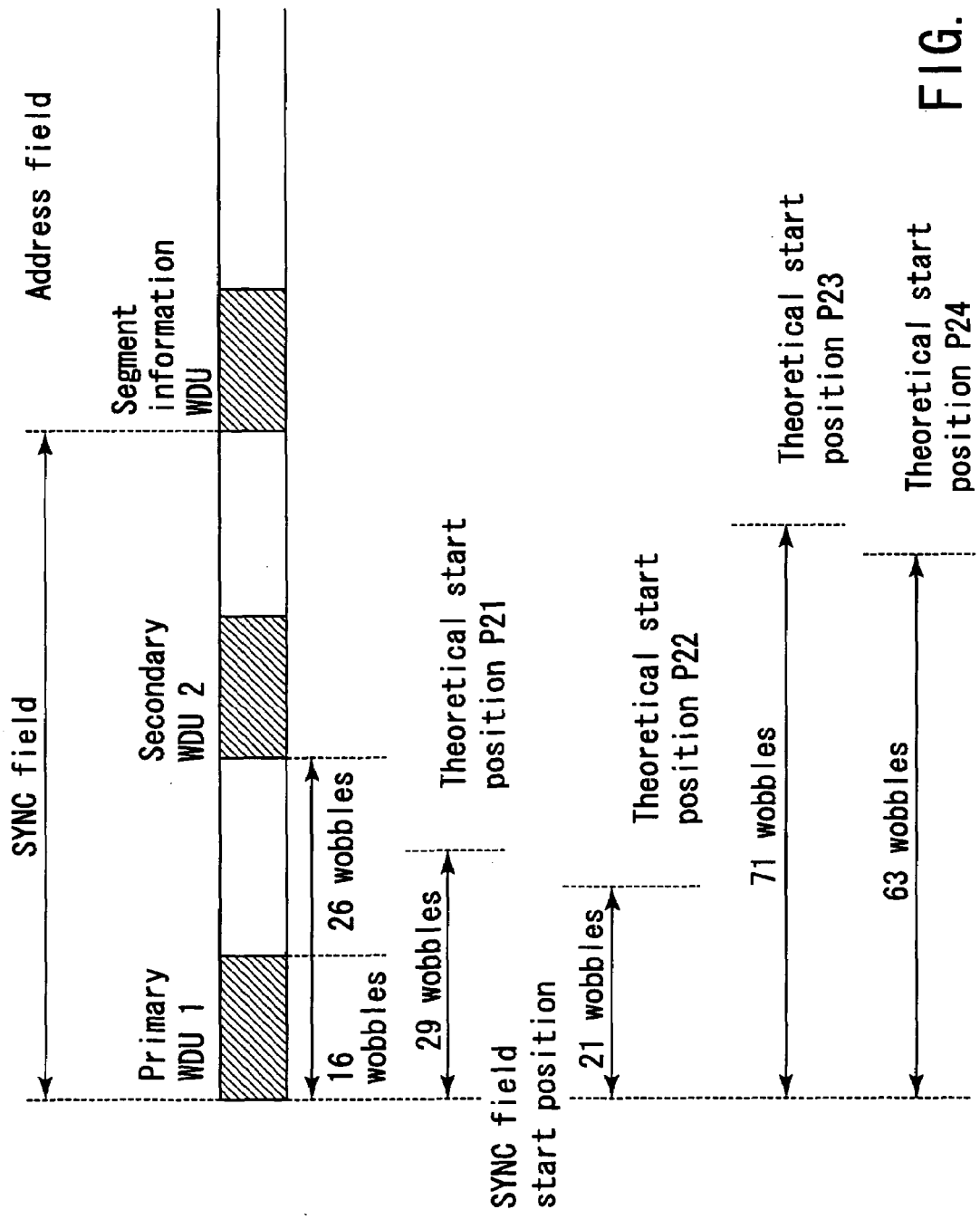
FIG. 12 is an explanatory view showing various examples of the link portion according to this invention.

With reference to FIG. 12, reasons for setting the points P11, P12, P13, P14 as above will be described below. It has been described earlier that the preformat information is recorded in the Physical segments on the track. It has also been described earlier that the synchronous field first exists and next the Address field exists in the preformat information (FIG. 5, FIG. 6, FIG. 8A to FIG. 8C). Directing attention here to the synchronous field, 16 wobbles from the head are utilized as data, and remaining 68 wobbles are unmodulated. Therefore, if the write start point is set in an area after 16 wobbles have passed from the head, wobbles themselves do not tend to be affected, and information at the head position of the Data segment does not either tend to receive noise from a wobble modification signal.

Taking such an advantage into account, the present invention has been designed to have a Data segment arrangement shown in FIG. 11. FIG. 12 shows a secondary wobble data unit (WDU2) in addition to a primary wobble data unit (WDU1) (adopted in the case of a next-generation rewritable disc (HD-DVD for rewritable disc). The WDU2 is adopted when the optical disc is a recordable disc (DVD-R)(DVD-Recordable). 26 wobbles exist between the WDU1 and WDU2. FIG. 12 shows not only the point after 24 wobbles from the head of the synchronous field but also various points.

It should be noted that the SYNC fields for both the rewritable disc and the recordable disc are shown in FIG. 12, but only the WDU1 exist in the rewritable disc and the latter half is totally an unmodulated section (68 wobbles) as shown in FIG. 8A.

A basic idea of the present invention is to set a head position of a next write Data segment in an area where the wobble is not modulated. Therefore, the head position may be set at any of positions P21, P22, P23, P24 shown in FIG. 12. Further, if the head position is set at a position after 71 wobbles from the head or a position after 63 wobbles from the head, enough time can be obtained when next writing is started after precisely confirming information on the synchronous field.

Figures 13, 14:
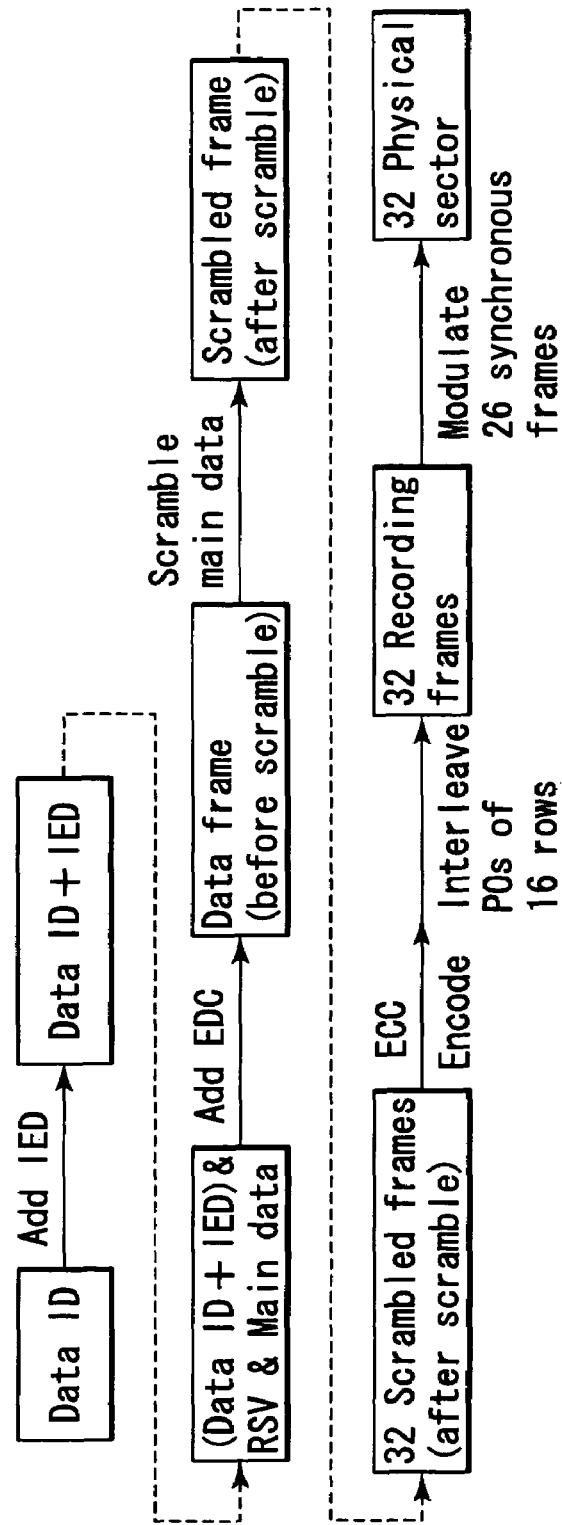
FIG. 13 is a view showing an example of a Data segment configuration.
FIG. 14 is an explanatory view showing how data changes from main data to recording frames before being recorded on a recording medium.

Next, FIG. 13 shows the Data segment described above, and its layout will be described. The Data segment is constituted by a VFO (variable frequency oscillator) field, a data field, a postamble field, a reserved field and a buffer field. The data word in the VFO field is set to 7Eh. A modulation pattern is repetitive "010001000100".

Data recorded in the data field of an information recording medium is called the Data frame, a scrambled frame, a recording frame or a recorded data field, depending upon signal processing steps, as shown in FIG. 14. The Data frame is made of 2048 bytes, and has main data, a 4-byte data ID, a 2-byte ID error detection code (IED), 6 reserved bytes, and a 4-byte error detection code (EDC).

After the error detection code (EDC) is added, the main data is scrambled. Here, a cross Reed-Solomon error correction code is applied to 32 scrambled Data frames (scrambled frames), and so called ECC encode processing is performed. The recording frame is thus constituted. This recording frame includes a parity of outer-code (PO) and a parity of inner-code (PI).

The PO and PI are error correction codes created for the ECC blocks each constituted by 32 scrambled frames.

8/12 modulation is applied to the recorded data field. Then, a synchronous code (SYNC) is added to a head per 91 bytes to become the recording frame. Four recorded data fields are recorded in one data field.

Figures 15, 16:
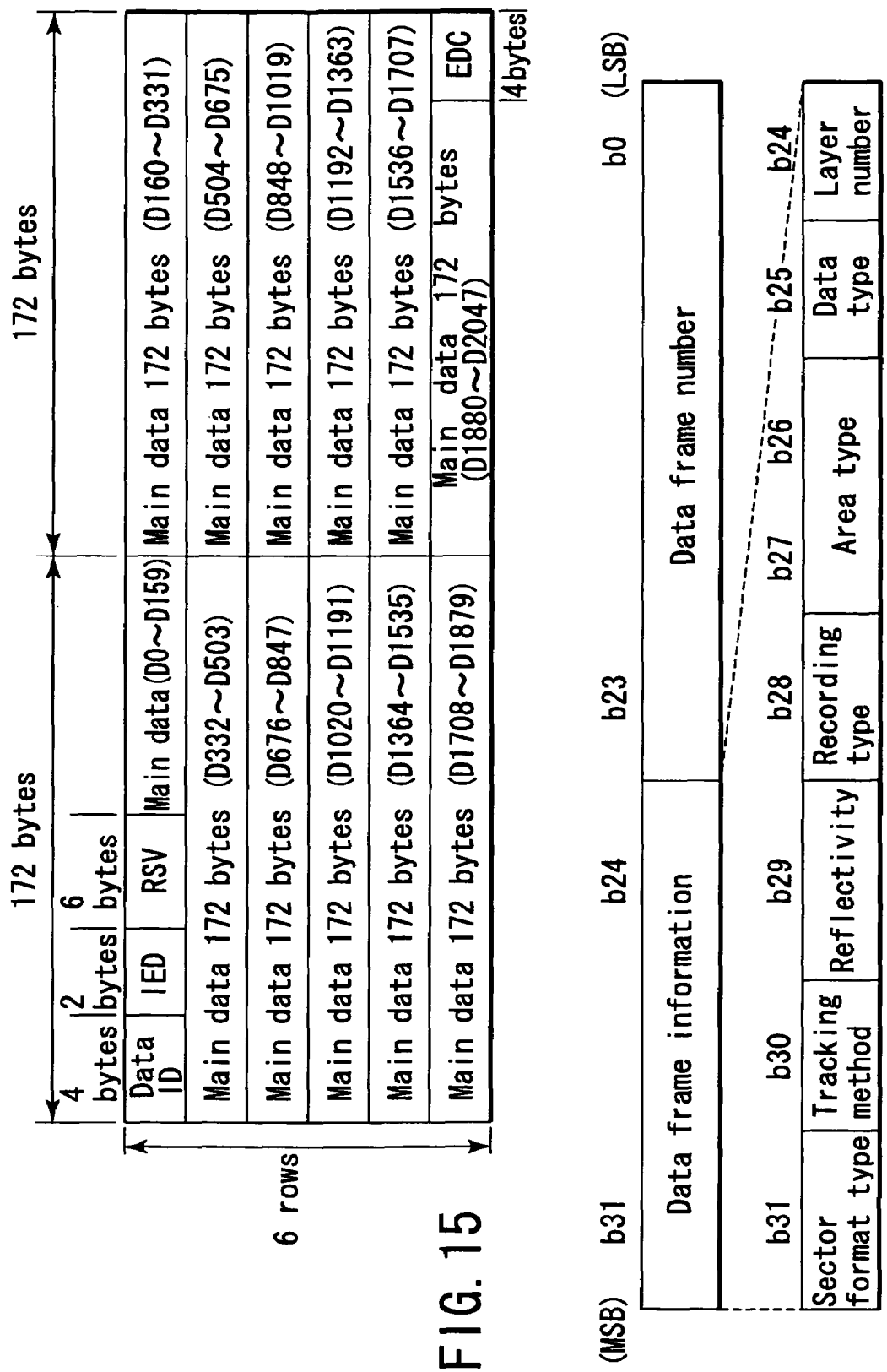
FIG. 15 is an explanatory view showing a form of an initial Data frame when recording data rows are obtained.
FIG. 16 is an explanatory view of a data ID of FIG. 15.

FIG. 14 shows how data changes from the main data to the recording frame. FIG. 15 shows a form of the Data frame. The Data frame has 2064 bytes made of 172 bytes×2×6 rows in which 2048-byte main data is included.

FIG. 16 shows the data ID. The data ID is constituted by four bytes. First one byte from bit b31 to bit b24 is Data frame information, and three bytes (bit b23 to bit b0) are a Data frame number.

The Data frame information in a System Lead-in area includes as follows: information such as a sector format type, tracking method, reflectivity, recording type, area type, data type and layer number.

The sector format type . . . zone format type if 1b, the tracking method . . . pit tracking if 0b, the reflectivity . . . equal to or more than 40% if 1b, the recording type . . . general if 0b and real time information if 1b (defect managing method is different between 0b and 1b), the area type . . . Lead-in area if 01b, the data type . . . read only data if 0b, and the layer number . . . indicates a layer 0 of a dual layer, or a single-layer disc if 0b, and indicates a layer 1 of the dual layer if 1b.

The data frame information in a Data area, Data Lead-in area and Data Lead-out area are as follows.

The sector format type . . . zone format type if 1b, the tracking method . . . groove tracking if 1b, the reflectivity . . . equal to or less than 40% if 1b, the recording type . . . general if 0b and real time information if 1b (defect managing method is different between 0b and 1b), the area type . . . Data area if 00b, Lead-in area if 01b, and Lead-out area if 10b, the data type . . . rewritable data if 1b, and the layer number indicates the layer 0 of the dual layer, or single-layer disc if 0b, and indicates the layer 1 of the dual layer if 1b. In addition, these bits must be assigned in accordance with the rule mentioned above.

The IED functions and is used as the error detection code of the above data ID.

Next, a 6-byte RSV will be described.

The RSV is 0 h and reserved. The error detection code (EDC) is a 4-byte check code, and attached to 2060 bytes of the Data frame before being scrambled.

Figures 17A, 17B:
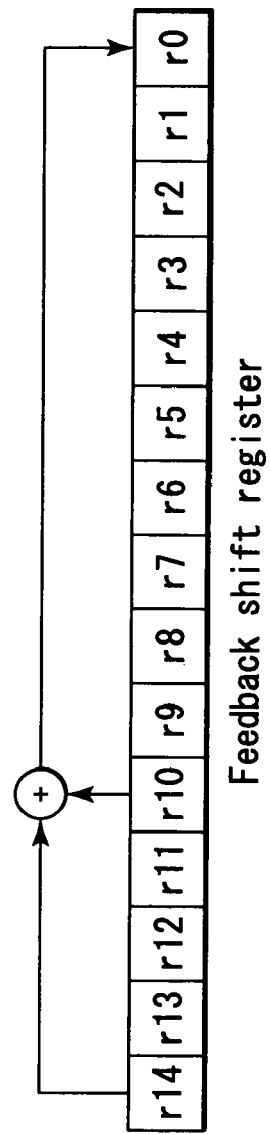
FIG. 17A and FIG. 17B are views showing an example of initial values given to a feedback shift register when scrambled frames are produced and an example of the feedback shift register for producing scrambled bytes.

FIG. 17A shows an example of initial values given to a feedback shift register when scrambled frames are produced, and FIG. 17B shows the feedback shift register for producing scrambled bytes. 16 kinds of preset values are prepared. r7 (MSB) to r0 (LSB) are shifted by eight bits, and used as the scrambled bytes. Initial preset numbers in FIG. 17A are equal to four bits (b7 (MSB) to b4 (LSB)) of the data ID. At the start of Data frame scrambling, the initial values of r14 to r0 must be set to the initial preset values on a table in FIG. 17A.

The same initial preset values are used for 16 sequential Data frames. Next, the initial preset values are switched, and the same switched preset values are used for 16 sequential Data frames. Low eight bits of the initial values of r7 to r0 are taken out as scrambled byte S0. After that, eight bits are shifted, and then the scrambled bytes are taken out, and such an operation is repeated 2047 times. When scrambled bytes S0 to S2047 are taken out from r7 to r0, the Data frames change from main bytes Dk to scrambled bytes D'k.

Next, constitution of the ECC block will be described.

Figure 18:
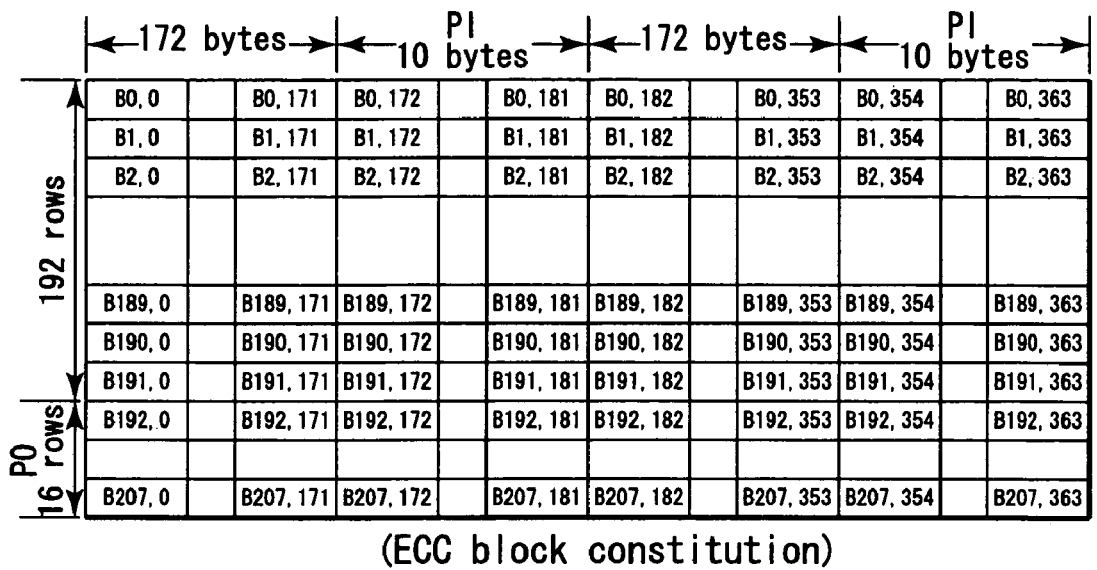
FIG. 18 is a view showing an ECC block formed of 32 continuous frames.

FIG. 18 shows the ECC block. The ECC block is formed of sequential 32 scrambled frames. 192 rows+16 rows are aligned in a vertical direction, and (172+10)×2 columns are aligned in a horizontal direction. B0, 0, B1, 0, . . . are each one byte. PO and PI are error correction codes, and are an outer parity and an inner parity.

Figure 19:
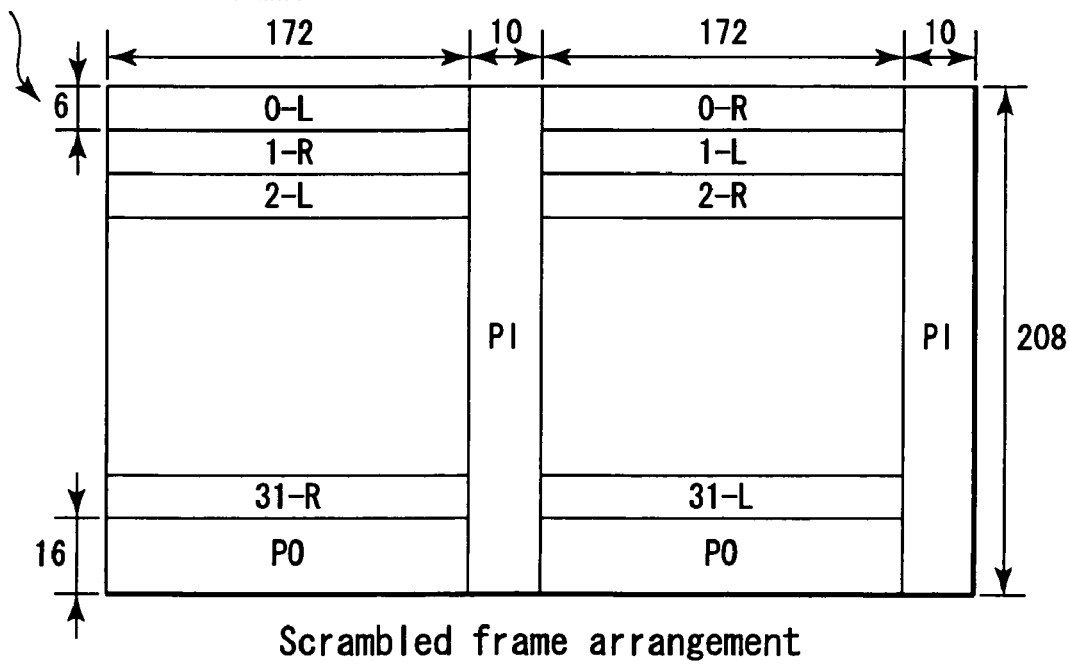
FIG. 19 is a view of the ECC block rewritten as a scrambled frame arrangement.

In the ECC block of FIG. 18, a unit (6 rows×172 bytes) is treated as one scrambled frame. FIG. 19 is a view which is thus rewritten as a scrambled frame arrangement. This is constituted of sequential 32 scrambled frames. Further, (block 182 bytes×207 bytes) is treated as a pair in this system. If L is added to each scrambled frame number of the ECC block on a left side, and R is added to each scrambled frame number of the ECC block on a right side, the scrambled frames are arranged as shown in FIG. 19. In other words, left and right scrambled frames exist alternately in the left side block, and the scrambled frames exist alternately in the right side block.

In other words, the ECC block is formed of sequential 32 scrambled frames. Rows in the left half of an odd sector are exchanged for rows in the right half. 172×2 bytes×192 rows are equal to 172 bytes×12 rows×32 scrambled frames, and become an information field. 16-byte PO is added in order to form RS (208, 192, 17) outer codes in each of 172×2 rows. Further, 10-byte PI (RS (182, 172, 11)) is added to each of 208×2 rows in the left and right blocks. PI is also added to the PO rows. The numbers in the frames indicate the scrambled frame numbers, and suffixes R, L signify the right half and left half of the scrambled frames.

PO and PI shown in FIG. 19 are formed in the following procedure.

First, 16-byte Bi,j (i=192 to 207) is added to column j (j=0 to 171, and j=182 to 353). This Bi,j is defined by a polynomial equation Rj(X), and this polynomial equation forms the outer codes RS (208, 192, 17) into 172×2 rows.

Next, 10-byte Bi,j (j=172 to 181, and j=354 to 363) is added to row i (i=0 to 207). This Bi,j is defined by a polynomial equation Ri(X), and this polynomial equation forms inner codes RS (182, 172, 11) into (208×2)/2 rows.

The Bi,j which is a factor of each B matrix of FIG. 18 constitutes 208 rows×182×2 columns. This B matrix is interleaved between the rows so that the Bi,j will be relocated in Bm,n.

Figure 20:
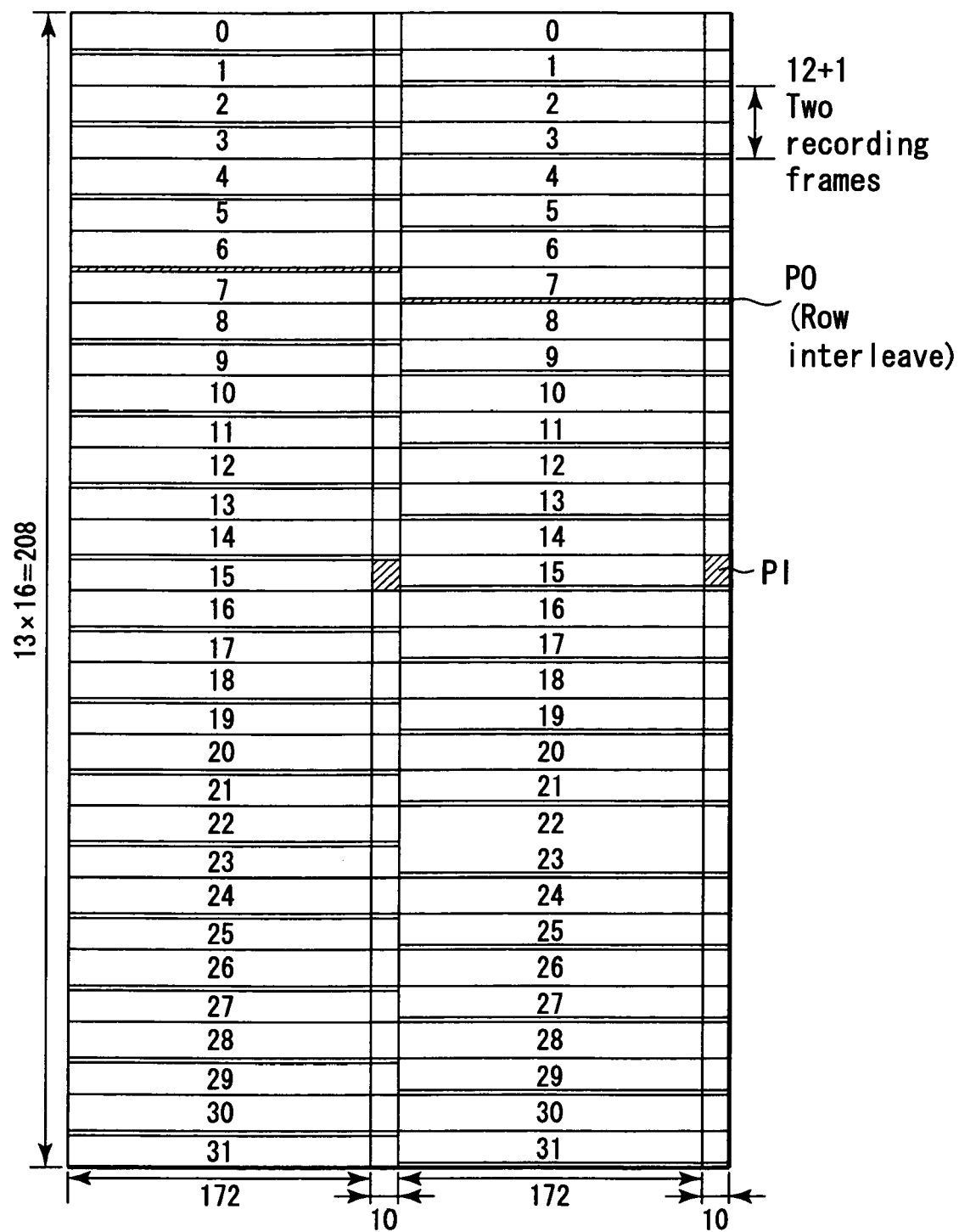
FIG. 20 is an explanatory view showing 16 parity rows dispersed in the ECC block.

As a result, 16 parity rows are dispersed row by row, as shown in FIG. 20. In other words, the 16 parity rows are placed one by one every two recording frames. Therefore, the recording frame composed of 12 rows results in 12 rows+1 row. After this row interleave is performed, 13 rows×182 bytes are referred to as the recording frame. Therefore, the ECC block after the row interleave is performed results in 32 recording frames. As shown in FIG. 20, six rows of right side block and six rows of left side block exist in the recording frame of 12+1 rows. Further, POs are placed in a manner to be in different rows in left block (182×208 bytes) and in the right block (182×208 bytes). The drawing shows one completed type ECC block. However, during actual data reproduction, such an ECC block comes successively to an error correction processing section. In order to improve correction ability of such error correction processing, an interleave method as shown in FIG. 20 has been adopted.

Next, constitution of the Physical sector will be described.

The recording frame of 13 rows×182 bytes (2366 bytes) is successively modulated, to which two synchronous codes are added. One synchronous code is added before a 0th row, and the other synchronous code is added before a 91st row. At the start of the data field, a synchronous code SY0 is in state 1 (state 1 in FIG. 22). The recorded data field is 13 sets×2 sync frames, as shown in FIG. 21A, FIG. 21B. One recorded data field having a 29016-channel bit length is equivalent to 2418 bytes before modulation.

SY0 to SY3 in FIG. 21A and FIG. 21B are synchronous codes (SYNC), which are selected from codes shown in FIG. 22. Number 24 and number 1092 described in FIG. 21A and FIG. 21B represent channel bit lengths.

In FIG. 21A and FIG. 21B, PO (Parity Out) information shown in FIG. 20 is inserted into a sync Data area within the last two sync frames (i.e., part where the last "SYNC code is SY 3", part immediately after that where "SYNC data" and "sync code is SY 1", and part immediately after that where "sync code" is aligned), both in an even physical sector and an odd physical sector. FIG. 21A and FIG. 21B show 12+1 rows, which are parts taken from FIG. 20. "A portion of the left side PO" shown in FIG. 20 is inserted into the last two-sync frame part in an even Physical sector, and "a portion of the right side PO" shown in FIG. 20 is inserted into the last two-sync frame part in an odd Physical sector. As shown in FIG. 19 and FIG. 20, one ECC block is constituted of right and left "small ECC blocks", into which data of a PO group (PO belonging to a left small ECC block, or PO belonging to a right small ECC block) which is alternately different for each sector is inserted.

A left side Physical sector in which synchronous codes SY3 and SY1 continue is shown in FIG. 21A, and a right side Physical sector in which synchronous codes SY3 and SY1 continue is shown in FIG. 21B. The ECC block is constituted as described above. The concept of the present invention does not always need a method in which right and left rows (every six rows) are interchanged, as shown in FIG. 19.

A format of one Physical segment is formed by 17 wobble data units (WDU), as described earlier. Demodulated data within 0 to 17 wobble data units (WDU) (17 units) become data having a predetermined meaning when put together.

A physical structure is built as described above, that is, 1 Data segment=7 Physical segments, one Physical segment=17 wobble data units, 1 wobble data unit=84 wobbles, 1 wobble=93 channel bits,.

One sector has 26 synchronous frames (equivalent to sync frames in FIG. 21A and FIG. 21B). 1 ECC block equals to 32 sectors, which is thus 26×32=832 sync frames if expressed in frame. Here, one sync frame is added as a guard area in the present invention. This results in 832+1=833 frames as a whole. If the number 833 is the recording data block rows, it results in 833=7×7×17, thereby making it possible to constitute one recording data block with 7 Physical segments. In other words, if one segment length is 199 frames, it results in 199×7=833, thereby making it possible to realize a constitution which can not be divide by E=2, E=4 or the like.

In this way, a physical array of the modulated recording data of the ECC block becomes asynchronous with a physical position of the preformat information. This means less correlativity of the format information with the data array of the ECC block and thus less mutual interference. It is thus possible to prevent mutual data reproducibility from deteriorating.

The medium such as the recordable optical disc medium or rewritable optical disc medium has been described above in which the Physical segments are recorded as the preformat.

However, the recording data format can also be introduced to a ROM type medium without significant format efficiency deterioration. In the case of the ROM type medium, the optical disc itself does not have a format demodulation portion and thus data deterioration will not directly cause a problem, but application of the constitution of the present invention so as to keep compatibility with the recordable media is also effective in configuring an optical disc apparatus at low cost.

FIG. 23 shows a configuration example of an information recording/producing apparatus for which the present invention is provided, and shows extracted parts that are particularly associated with the present invention. The preformat information is recorded in an optical disc 110, as described above. Rotation of the optical disc 110 is controlled by a spindle motor 121. The track of the optical disc 110 is tracked by an optical beam from an optical head 130. The optical head 130 is provided with a servo function which controls focus and tracking.

A signal read by the optical head 130 is supplied to a clock generator 131 which generates a clock synchronous with the wobble signal and to a wobble signal information demodulation section 132 for demodulating data that is modulating the wobble signal. The read signal is also input to a reproduction signal processing section 133. The reproduction signal processing section 133 applies error correction processing to the ECC block, and separates main video packets, audio packets, sub video packet and the like in accordance with a DVD format. The data in the separated packets are supplied to blocks in a decoder group 134 where they are decoded. Further, a system control section 150 reads control data, and recognizes a data reading position, or attribution, streams and the like.

A recording system will next be described. Main video packets, audio data and the like are encoded by an encoder group 141, and input to a recording signal processing section 142. In the recording signal processing section, original data is compressed by an encoder, and then formed into packets and converted into the DVD format. The recording signal processing section 142 constructs an ECC clock as described earlier and creates a recording field as described in FIG. 14, which is sent to a write signal output section 143.

The write signal output section 143 has a buffer memory, stores the Data segments as described in FIGS. 11 and 12, and prepares a recording cluster. Then, a timing signal generation section 152 in the system control section 150 gives a timing signal for starting recording to the write signal output section 143. When given the timing signal for starting recording, the write signal output section 143 gives a recording segment signal as a laser light control signal for the optical head 130. In this way, recording timing as described in FIG. 11 and FIG. 12 can be obtained.

The wobble signal information demodulation section 132 gives data corresponding to modulated portions and unmodulated portions of the wobble signal to a demodulation information analysis section 151 in the system control section 150. In this way, the demodulation information analysis section 151 recognizes the address and head of a current Physical segment. A clock whose phase is synchronous with the wobble signal is also introduced to the system control section 150. Therefore, the system control section 150 counts the number of wobble waves from the time when the optical beam passed the head of the Physical segment. Various kinds of timing shown in FIG. 11 and FIG. 12 are thus recognized.

The present invention makes it possible to realize an optical disc medium and an optical disc apparatus capable of effective data recording even in high-density recording.

As described above, in the configuration of the present invention, the recording track is divided into a plurality of Physical segments and the recording track meanders so that the wobble signal can be obtained, and the wobble data unit including a predetermined number of repeated waves is defined in the wobble signal. The wobble data unit can have a modulated zone and an unmodulated zone therein, and in accordance with modulated zone information, address information of the Physical segments is defined to be expressed by gathering information of a plurality of wobble data units. A plurality of wobble data units is put together to form at least the synchronous field and Address field. The synchronous field includes one wobble data unit, and the modulated portion and unmodulated portion of the wobble signal are included in the wobble data unit, and synchronous bit information is included in the modulated portion. This invention is not limited to the optical disc and its information recording method and apparatus, but covers a reproduction apparatus and method.

More specifically, the reproduction method and the reproduction apparatus can be applied to the optical disc in which the recording track is divided into a plurality of Physical segments, and the recording track meanders, and when a reproduction signal is obtained from the Data segments recorded on the recording track, the wobble signal attributed to the meandering shape and the wobble signal modulated in accordance with the meandering shape can be obtained.

Characteristics are in that the wobble data unit is defined which is a unit of a predetermined number of repeated waves in the wobble signal, and the wobble data unit can have a modulated zone and an unmodulated zone therein. At least the synchronous field and Address field are defined by a plurality of gathered wobble data units. The address information of the Physical segments is expressed by putting together information of the unmodulated zone of the Address field. The synchronous field includes one wobble data unit, and the modulated portion and unmodulated portion of the wobble signal are included in the wobble data unit, and the synchronous bit information is included in the modulated portion. The head position of the Data segment additionally recorded is set to exist in a track area of a zone where the unmodulated portion within the wobble data unit of the synchronous field exists. Here, the reproduction apparatus and method can search the head position of the Data segment by referring to the information on the wobble data unit and counting the number of repeated wobble signals. It is not necessary to mention that the concept of this invention can also be utilized for an erase function of the Data segment.

The wobble address in periodic position (FIG. 5) is used as the information for specifying the Physical segment. 17 WDUs are assigned into the wobble address.

In this way, the head position of the Data segment to be recorded is set to exist in the track of a zone where the unmodulated portion within the wobble data units constituting the synchronous field exists, in the present invention.

Furthermore, as described above, the present invention is directed to an optical disc medium which has a spirally formed recording track divided into Physical segments having a predetermined length, wherein the preformat information is formed at a predetermined position which is one part of the Physical segment. Here, an original data row having a predetermined length is divided into blocks, and thus error correction codes are generated and added thereto, and moreover, a recording data row (FIG. 21A and FIG. 21B) which is constituted of a plurality of synchronous frames having a fixed number of data converted into synchronous data (SY0 to SY3) and coded data is generated at the head. When this data is recorded on the track, coded data out of the data which contributes to the generation of the same error correction code are located in the recording data row at constant intervals E. Here, a fundamental principle is that a recording data block length L in which an additional synchronous frame is added to the recording data row, and a Physical segment length A result in L=mA by use of a natural number m, and A can not be divided by E.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical disc comprising:
  a recording track being wobbled that is divided into a plurality of physical segments;
  each one of the physical segments being divided into a plurality of wobble data units;
  each one of the wobble data units being configured by a modulated portion of 16 wobbles and an unmodulated portion of remaining wobbles; and the wobble data unit of a head portion of each one of the physical segments is configured as a synchronous (SYNC) field with a format of a modulated portion of 6 wobbles having an inverse phase wobble (IPW), an unmodulated portion of 4 wobbles having normal phase wobble (NPW), and a modulated portion of 6 wobbles of inverse phase wobble (IPW);

wherein information as unit of a data segment is recorded on the recording track, and the top of the data segment is set in the vicinity of 24th wobble from the head of the SYNC field.

2. The optical disk according to claim 1, wherein the SYNC field further comprises an unmodulated portion of 68 wobbles of normal phase wobble (NPW).

3. A method of recording information on an optical disk, in which the optical disk includes a recording track being wobbled that is divided into a plurality of physical segments, each one of the physical segments being divided into a plurality of wobble data units, each one of the wobble data units being configured by a modulated portion of 16 wobbles and an unmodulated portion of remaining wobbles, the wobble data unit of a head portion of each one of the physical segments is configured as a synchronous (SYNC) field with a format of a modulated portion of 6 wobbles having an inverse phase wobble (IPW), an unmodulated portion of 4 wobbles having normal phase wobble (NPW), and a modulated portion of 6 wobbles of inverse phase wobble (IPW), and information as unit of a data segment being recorded on the recording track, the method comprising:

preparing the data segment for recording;

recognizing an address of the physical segment from reproduction information on a modulated portion and an unmodulated portion included in the SYNC field and the address field; and writing a head of the data segment for recording from in the vicinity of 24th wobble from the head of the SYNC field.

4. An apparatus for recording information on an optical disk, in which the optical disk includes a recording track being wobbled that is divided into a plurality of physical segments, each one of the physical segments being divided into a plurality of wobble data units, each one of the wobble data units being configured by a modulated portion of 16 wobbles and an unmodulated portion of remain the wobble data unit of a head portion of each one of the physical segments is configured as a synchronous (SYNC) field with a format of a modulated portion of 6 wobbles having an inverse phase wobble (IPW), an unmodulated portion of 4 wobbles having normal phase wobble (NPW), and a modulated portion of 6 wobbles of inverse phase wobble (IPW), and information as unit of a data segment being recorded on the recording track and the top of the data segment being set in the vicinity of 24th wobble from the head of the SYNC field, the apparatus comprising:

a recording signal processing section which prepares a data segment for recording;

a wobble signal information demodulation section and a demodulation information analysis section which recognize a head and an address of the physical segment from reproduction information on a modulated portion and an unmodulated portion included in the SYNC field and the address field; and a timing signal generation section and a write signal output section which write a head of the data segment for recording from in the vicinity of 24th wobble from the head of the SYNC field.

* * * * *